(12) United States Patent
Goto et al.

(10) Patent No.: US 7,186,794 B2
(45) Date of Patent: Mar. 6, 2007

(54) POLYMER TREATING METHOD AND APPARATUS

(75) Inventors: Toshiharu Goto, Ibaraki (JP); Takanori Yamazaki, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/958,730

(22) Filed: Oct. 6, 2004

(65) Prior Publication Data

US 2005/0261470 A1   Nov. 24, 2005

(30) Foreign Application Priority Data

May 19, 2004   (JP) .............................. 2004-149230

(51) Int. Cl.
*C08F 6/00* (2006.01)
(52) U.S. Cl. .................. 528/480; 264/176.1; 264/219; 422/131; 528/481; 528/482
(58) Field of Classification Search ............. 264/176.1, 264/219; 422/131; 528/480, 481, 482
See application file for complete search history.

(56) References Cited

U.S. PATENT DOCUMENTS

| 6,258,928 B1 | * | 7/2001 | Baird et al. ................. 528/310 |
| 6,580,005 B1 | * | 6/2003 | Yazaki et al. ............... 562/483 |
| 6,794,476 B2 | * | 9/2004 | Machida et al. ............ 526/351 |

FOREIGN PATENT DOCUMENTS

| JP | 2001-253967 A | | 9/2001 |
| JP | 2001253967 | * | 9/2001 |
| JP | 2002-249618 A | | 9/2002 |
| JP | 2002249618 | * | 9/2002 |

* cited by examiner

*Primary Examiner*—Terressa Boykin
(74) *Attorney, Agent, or Firm*—Foley & Lardner LLP

(57) ABSTRACT

A polymer treating method has the steps of: reacting a polymer compound with a reaction agent in a reaction vessel to generate a polymer treatment product; discharging the polymer treatment product containing the reaction agent from the reaction vessel; depressurizing the polymer treatment product; introducing the polymer treatment product into a degassing extruder; separating the reaction agent from the polymer treatment product through a vent box that is connected to upstream of the degassing extruder and that has a volume of equal to or more than that of the reaction vessel; and extruding the polymer treatment product from the degassing extruder.

30 Claims, 4 Drawing Sheets

POLYMER TREATING METHOD AND APPARATUS

The present application is based on Japanese patent application No.2004-149230, the entire contents of which are incorporated herein by reference.

BACKGROUND OF THE INVENTION

1. Field of the Invention

The invention relates to a polymer treating method and a polymer treating apparatus that a polymer is processed into thermoplastic resin or wax by denaturalization or decomposition, or by cutting the cross-link point or molecular chain of cross-linked polymer, and more particularly to a polymer treating method and a polymer treating apparatus that a polymer is reacted with a reaction agent in supercritical state by using an extruder.

2. Description of the Related Art

In recent years, as environment problems become important, the cost in disposal of wastage tends to increase. Regeneration or recycle of polymer is also desired. In this trend, the material recycle of thermoplastic resin is developed since it is possible to mold the thermoplastic resin again by using the fluidization property obtained by heating.

However, a thermosetting resin, a cross-linked polymer, rubber etc. are difficult to apply to the material recycling since the fluidization property thereof cannot be obtained even by heating due to the molecular three-dimensional network. Therefore, although the thermal recycling thereof is somewhat done, they are mostly discarded as landfill waste etc.

A technique is researched that realizes the material recycle of thermosetting resin or cross-linked polymer. For example, proposed are a method of processing a polymer into thermoplastic resin by deforming the molecular three-dimensional network structure to recycle it, and a method of making low-molecular substance (wax substance) by cutting the principal chain of a polymer to reuse it as an additive.

In order to put such a method into practical use, a means for treating the polymer continuously is required. Extruders are suitable for that purpose. Heat and pressure conditions required in processing a stable thermosetting resin or cross-linked polymer into thermoplastic resin by deforming the molecular three-dimensional network structure can be easily satisfied by the extruders. Those in making a wax substance can be easily satisfied thereby as well. Also, in making the thermoplastic resin, a thermosetting resin or other agent can be easily added to the thermosetting resin or cross-linked polymer by using the extruder.

Japanese patent application laid-open No.2001-253967 (prior art 1) discloses a method that cross-linked polyethylene and water are supplied into an extruder, and are processed into a thermoplastic material by extruding under conditions to make water to be supercritical or semi-critical in the extruder, i.e., at a temperature of 200 to 1000° C. and a pressure of 2 to 100 MPa.

Japanese patent application laid-open No.2002-249618 (prior art 2) discloses a method that a cross-linked polymer is introduced with a high-temperature and pressure fluid into a reaction vessel to generate a reacted substance, the reacted substance is introduced into a separator to be separated from the high-temperature fluid, and the reacted substance is extruded by the extruder.

In prior art 1, water serves as a reaction agent to process the thermosetting resin or cross-linked polymer into the thermoplastic material under the chemical reaction. However, prior art 1 does not disclose an effective means for separating the thermoplastic material after mixing the reaction agent with the thermosetting resin.

In prior art 2, a separation bath is used to separate the polymer from gas after mixing the reaction agent with the thermosetting resin. However, since the extruder of prior art 2 has to be disposed spatially, the manufacturing cost of apparatus increases. Further, if the polymer generated sticks to the wall of separation bath, it is difficult to supply the polymer into the degassing extruder.

SUMMARY OF THE INVENTION

It is an object of the invention to provide a polymer treating method that a polymer treatment product discharged from the reaction vessel can be stably supplied to the degassing extruder while preventing pressure fluctuation caused by the abrupt expansion of reaction agent.

It is a further object of the invention to provide a polymer treating apparatus that a polymer treatment product discharged from the reaction vessel can be stably supplied to the degassing extruder while preventing pressure fluctuation caused by the abrupt expansion of reaction agent.

According to the first aspect of the invention, a polymer treating method comprises the steps of:

reacting a polymer compound with a reaction agent in a reaction vessel to generate a polymer treatment product;

discharging the polymer treatment product containing the reaction agent from the reaction vessel;

depressurizing the polymer treatment product;

introducing the polymer treatment product into a degassing extruder;

separating the reaction agent from the polymer treatment product through a vent box that is connected to upstream of the degassing extruder and that has a volume of equal to or more than that of the reaction vessel; and extruding the polymer treatment product from the degassing extruder.

The above polymer treating method may employ the next modifications:

(i) The degassing extruder maybe a double-shaft extruder.

(ii)The degassing extruder may comprise a vent disposed on the discharge side thereof so as to remove the reaction agent remaining in the polymer treatment product.

(iii)The reaction vessel may be a distribution type reaction vessel that is connected to a polymer material supplying extruder at previous stage.

(iv)The depressurizing step may be conducted by a decompression device, and the extruding step may comprise a step of extruding the polymer treatment product from the degassing extruder while molding the polymer treatment product.

(v) The separating step may comprise a step of separating an impurity from the separated reaction agent and then storing the separated reaction agent so as to recycle it.

(vi) The polymer treating method may further comprise the steps of:

cooling the extruded polymer treatment product; and cutting the cooled polymer treatment product.

(vii)The reacting step may comprise any one of denaturalization, decomposition and cross-link cutting reactions applied to the polymer compound.

(viii)The polymer compound may be a cross-linked polymer, and the reaction agent may be alcohols or a mixture containing alcohols.

(ix)The polymer compound may be previously pelletized prior to application of the polymer treating method.

According to the second aspect of the invention, a polymer treating apparatus for reacting a polymer compound with a reaction agent in a reaction vessel to generate a polymer treatment product comprises:

a decompression device that decompresses the polymer treatment product containing the reaction agent discharged from the reaction vessel;

a degassing extruder into which the polymer treatment product discharged from the decompression device is introduced and which extrudes the polymer treatment product; and a vent box that is connected to upstream of the degassing extruder and that has a volume of equal to or more than that of the reaction vessel, the vent box serving to separate the reaction agent from the polymer treatment product.

The above polymer treating apparatus may employ the next modifications:

(i)The polymer treating apparatus may further comprise:

an impurity separation device that is connected to the vent box so as to separate an impurity from the separated reaction agent; and a pressure adjusting device that is disposed between the vent box and the impurity separation device so as to keep constant the inner pressure of the vent box, wherein the vent box comprises a heating device that is disposed on the periphery of the vent box so as to heat the vent box.

(ii)The vent box may comprise a relief valve to prevent from the rise of the pressure limit for the vent box.

(iii)The heating device may comprise an electric heater that is disposed on the periphery of storing portion for the polymer treatment product of the vent box.

(iv)The heating device may comprise a jacket for circulation of heating medium that is disposed on the periphery of storing portion for the polymer treatment product of the vent box, and a heating medium circulation unit that supplies the heating medium to the jacket.

(v) The impurity separation device may comprise a storing tank that stores the separated reaction agent, and the stored reaction agent may be supplied to the reaction vessel with the polymer compound.

(vi)The impurity separation device may comprise a filter that can separate the reaction agent from the powder from the degassing extruder.

(vii)The polymer treating apparatus may further comprise:

a cooling device that cools the polymer treatment product extruded from the degassing extruder; and a cutting device that cuts the cooled polymer treatment product.

(viii)The decompression device may comprise a discharge valve.

(ix) The decompression device may comprise a resistor body with multiple holes.

(x) The decompression device may comprise a resistor body with multiple holes and/or a flow rate adjusting valve.

Thus, in the invention, the degassing extruder is provided with the vent box as vent back that has a volume of equal to or more than the reactor vessel. Thereby, the reaction agent can be stably separated from the polymer treatment product. Therefore, the polymer treatment product discharged from the reaction vessel can be stably supplied to the degassing extruder while preventing pressure fluctuation caused by the abrupt expansion of reaction agent.

Even when resin containing a great amount of reaction agent is discharged from the polymer material supplying extruder to the degassing extruder, due to the large volume of vent box, the inner pressure of degassing extruder can be sufficiently decompressed while preventing the blockage in exhaust port of the vent box. Thus, the vent box serves as a buffer to pressure fluctuation. Thereby, pressure fluctuation in subsequent portions can be also suppressed, and the polymer treatment product can be subjected to the continuous and uniform molding.

It is more desirable that, in order to prevent the scattering of reaction agent caused by excess pressure rise, the volume of vent box is about Pv-times greater than that of the reactor vessel where the inner pressure of reactor vessel is Pv [MPa]. Thereby, even if gas in the reactor vessel is all flown into the vent box, the pressure of vent box can be kept lower than 1 MPa.

It is desirable that the vent box has the relief valve to keep the pressure of the vent box lower than 1 MPa.

In the invention, "polymer" means a synthetic polymer such as cross-linked polymers, plastics and rubbers, a natural polymer such as lignins, celluloses and proteins, and a mixture of synthetic polymer and natural polymer. Further, it may contain materials other than polymers as a main component, like a shredder dust.

The method and apparatus of the invention are especially effective for the case of using a cross-linked polymer as the polymer and alcohols or a mixture containing alcohols as the reaction agent. Also, they are very effective for a case that at a high pressure as supercritical state, the suppression of pressure fluctuation as well as securing a sufficient reaction time is desired to facilitate the reaction with reaction agent.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
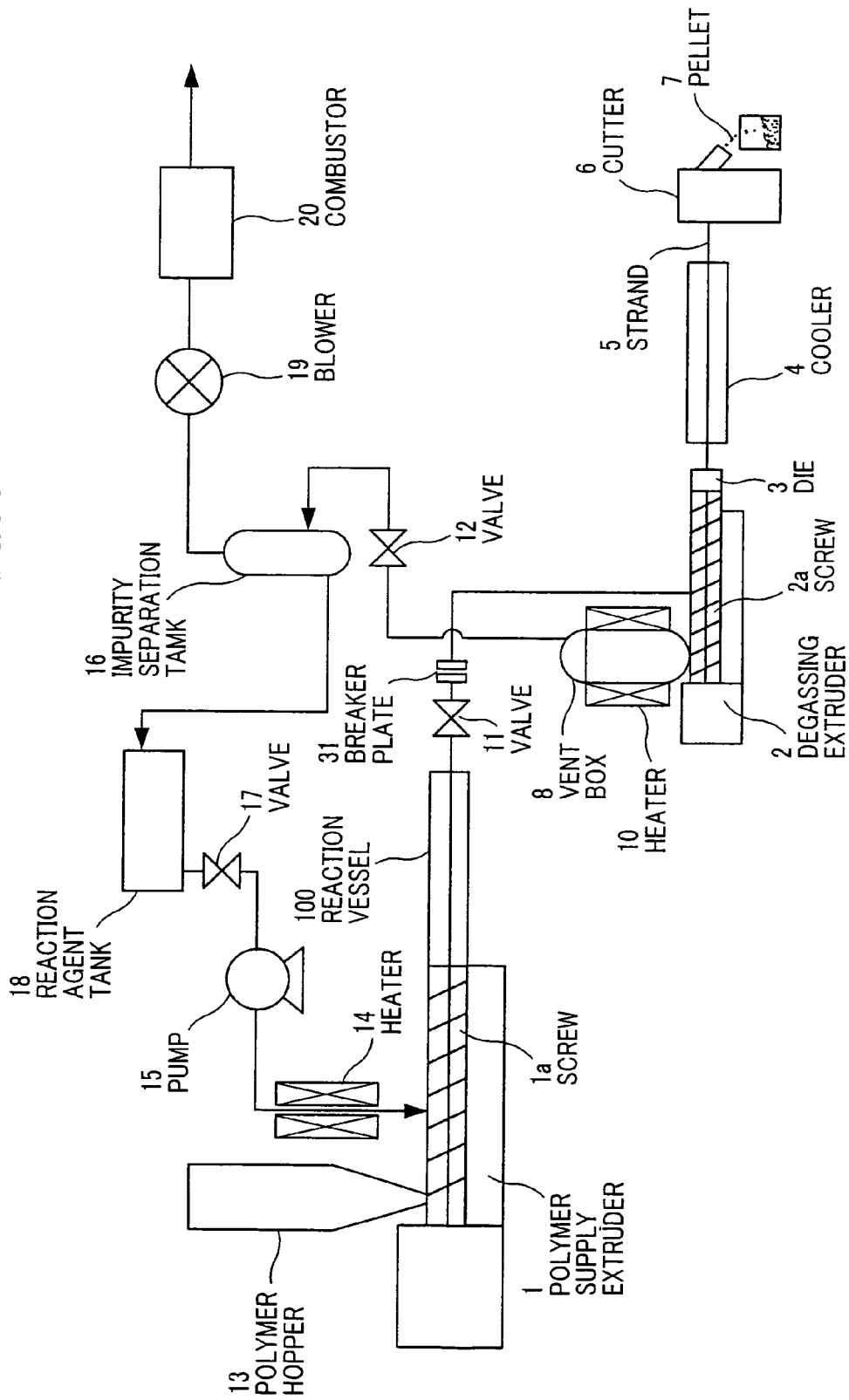
FIG. 1 is a flow diagram showing a cross-link cutting treatment apparatus for cross-linked polyethylene in a preferred embodiment of the invention.

FIG. 1 is a flow diagram showing a cross-link cutting treatment apparatus for cross-linked polyethylene in the preferred embodiment of the invention.

Referring to FIG. 1, cross-linked polyethylene being pelletized is put through a hopper 13 in a polymer material supplying extruder 1 (cylinder diameter of 33 mm, L/D=50). On the other hand, ethanol as a reaction agent necessary for the reaction is supplied from a reaction agent tank 18 through a valve 17 to the polymer material supplying extruder 1 while being compressed by a reaction agent supplying pump 15 and heated by a reaction agent heater 14. The supply position of reaction agent is desirably located downstream of a position where cross-linked polyethylene is sufficiently densified in the polymer material supplying extruder 1. Thereby, the reaction agent can be prevented from leaking toward upstream due to evaporation thereof.

The polymer material supplying extruder 1 uses a double-shaft extruder that has two screws 1a to prevent the flowback of high-temperature and pressure reaction agent and to facilitate the mixing of reaction agent. In the reaction agent supplying pump 15, it is required that the reaction agent is compressed higher than internal pressure of polymer material supplying extruder 1. In the reaction agent heater 14, it is desirable that the reaction agent is heated so as not to lower the temperature of polymer being increased by the polymer material supplying extruder 1. In the polymer material supplying extruder 1, the cross-linked polyethylene is mixed and agitated with the reaction agent by the screws 1a. In this process, at least part of the polymer material supplying extruder 1 is controlled to satisfy the temperature and pressure conditions that the reaction agent, ethanol is in supercritical state. Thereby, the cross-link cutting reaction between cross-linked polyethylene and ethanol proceeds sufficiently to have a good polymer treatment product. In this embodiment, a distribution type reaction vessel 100 with a volume of 50 litters is connected to the polymer material supplying extruder 1 so as to obtain a sufficient reaction time.

The mixture of: the polymer treatment product being plasticized from cross-linked polyethylene by the polymer material supplying extruder 1 and the distribution type reaction vessel 100; and the and the reaction agent, ethanol is stepwise depressurized by a decompression valve 11 (or discharge valve) as a pressure reducing means, and then by a breaker plate 31, which is a resistor body with multiple holes for decompression of the resin, attached to the decompression valve 11.

A degassing extruder 2 is further connected at the subsequent stage. In the degassing extruder 2, the polymer treatment product as viscous liquid is extruded by a screw 2a in the extrusion direction of the degassing extruder 2, and its gas component is flown into a vent box 8 as vent back with a reduced pressure. Thus, the reaction agent is separated from the polymer treatment product.

The vent box 8 is heated by a heater 10, an electric heater, for heating the vent box so as to be kept at a temperature that the polymer treatment product is fluidized.

Instead of using the heater 10, the vent box 8 maybe heated by using, though not shown, a jacket for circulation of heating medium that is disposed on the periphery of storing portion for the polymer treatment product of the vent box 8, and a heating medium circulation unit that supplies the heating medium to the jacket.

The vent box 8 has a volume of 100 litters twice the volume of distribution type reaction vessel 100. Since the vent box 8 has a volume greater than that of the distribution type reaction vessel 100, the inner pressure of vent box 8 can be reduced to ½ or lower than that of the distribution type reaction vessel 100 even if the resin and gas is extruded intermittently. The inner pressure of vent box 8 is kept slightly higher than atmospheric pressure and lower than that of the distribution type reaction vessel 100. Therefore, the polymer treatment product can be easily discharged from the vent box 8. In the vent box 8, light gas is separated to the top of vent box 8 and the polymer treatment product in melting state is retained to the bottom of vent box 8. The polymer treatment product is moved, by its own weight, from a hole at the bottom to the degassing extruder 2, and then molded by a die 3 at the discharge end of degassing extruder 2.

Figure 2:
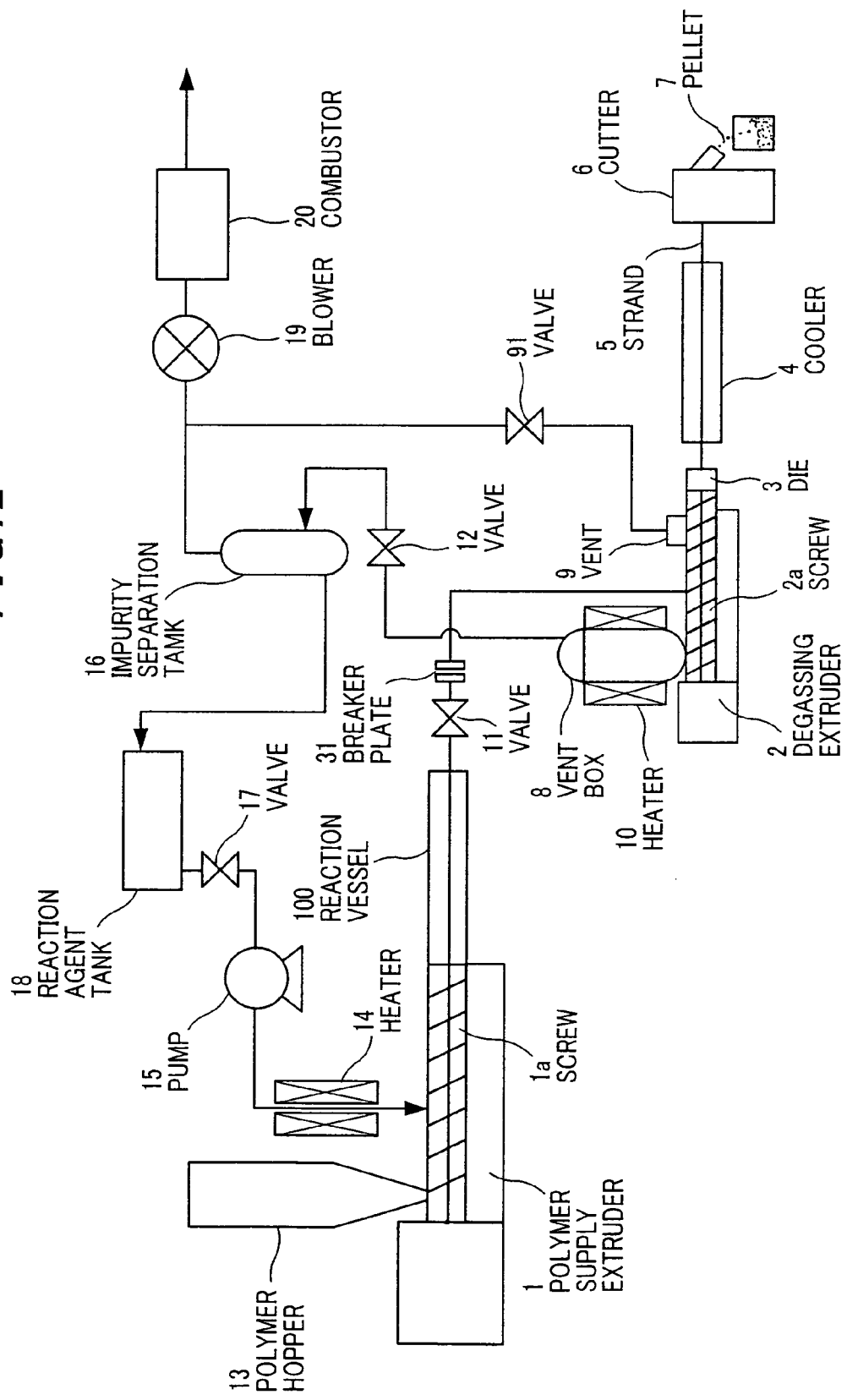
FIG. 2 is a flow diagram showing a cross-link cutting treatment apparatus for cross-linked polyethylene in another preferred embodiment of the invention.

The degassing extruder 2 may be a single-shaft or double-shaft extruder. In this embodiment, the polymer treatment product is molded into a filamented strand 5 and is then cooled and hardened nearly at room temperature by a cooler 4. The strand 5 is cut into pellets 7 by a strand cutter 6. The degassing extruder 2 may. be, as shown in FIG. 2, equipped with a vent 9 so as to perfectly remove the reaction agent from the resin.

On the other hand, the reaction agent, ethanol separated from the polymer treatment product in the vent box 8 is depressurized to atmospheric pressure through a tank pressure adjusting valve 12, and then transferred to an impurity separation tank 16. In the impurity separation tank 16, impurities generated in the reaction process and mixed in the reaction agent, ethanol are separated using a difference of boiling points. Ethanol is returned to the reaction agent tank 18, and the impurities are drawn through a blower 19 into a combustor 20, where they are burned.

The apparatus thus composed is especially effective for a case that the polymer treatment product has such a high viscosity as it does not flow before applying some force thereto. In prior arts 1 and 2 mentioned earlier, where the distribution type reaction vessel 100 is not used, the amount of processing per unit time must be limited if the polymer material supplying extruder 1 with a certain size is used since there is a limitation in elongating the cylinder of polymer material supplying extruder 1. In contrast, when the distribution type reaction vessel 100 is used, the amount of processing per unit time can be increased since a necessary reaction time can be arbitrarily secured by changing the size of distribution type reaction vessel 100. Such an apparatus is effective for a chemical reaction requiring a time more than 30 minutes, such as a silane cross-link cutting reaction between silane cross-linked polyethylene and alcohol.

When the polymer treatment product in melting state and the gaseous reaction agent are intermittently, not continuously, extruded through the decompression valve 11 from the polymer material supplying extruder 1, the gas is blown out therefrom while involving the polymer treatment product since it expands from compression state. Even in this case, the vent box 8 serves as a buffer against the pressure variation since it has a sufficient volume. Thus, the pressure fluctuation can be prevented in the extrusion direction of resin. Therefore, the molding of resin can be continued smoothly.

Further, since the polymer treatment product is sent from the distribution type reaction vessel 100 through the piping system to the degassing extruder 2, the problems in prior art 2 are not generated that when the polymer treatment product sticks to the wall of separation bath, it is difficult to extrude or due to the high viscosity of polymer treatment product, the supply of resin to the degassing extruder 2 discontinues. Thus, variation in the supply amount of resin can be reduced and the polymer treatment product can be supplied constantly.

When the vent box 8 is not used, the pressure fluctuation increases due to expansion of gas. Since this affects directly the molding side, the supply amount of material to the degassing extruder 2 is fluctuated or the gaseous reaction agent and polymer treatment product is blown out from a vent.

However, in this embodiment, since the degassing extruder 2 is equipped with the large vent box 8, even after the plasticization reaction generated at a high pressure, fluctuation in the supply amount of material to the degassing extruder 2 can be reduced and the mixed gas can be perfectly removed from the resin while kneading the mixture. Further, since it does not use the method of dropping, by its own weight, the polymer treatment product in a degassing bath, the entire apparatus can be in planar arrangement and the cost of apparatus can be lowered.

Figure 3:
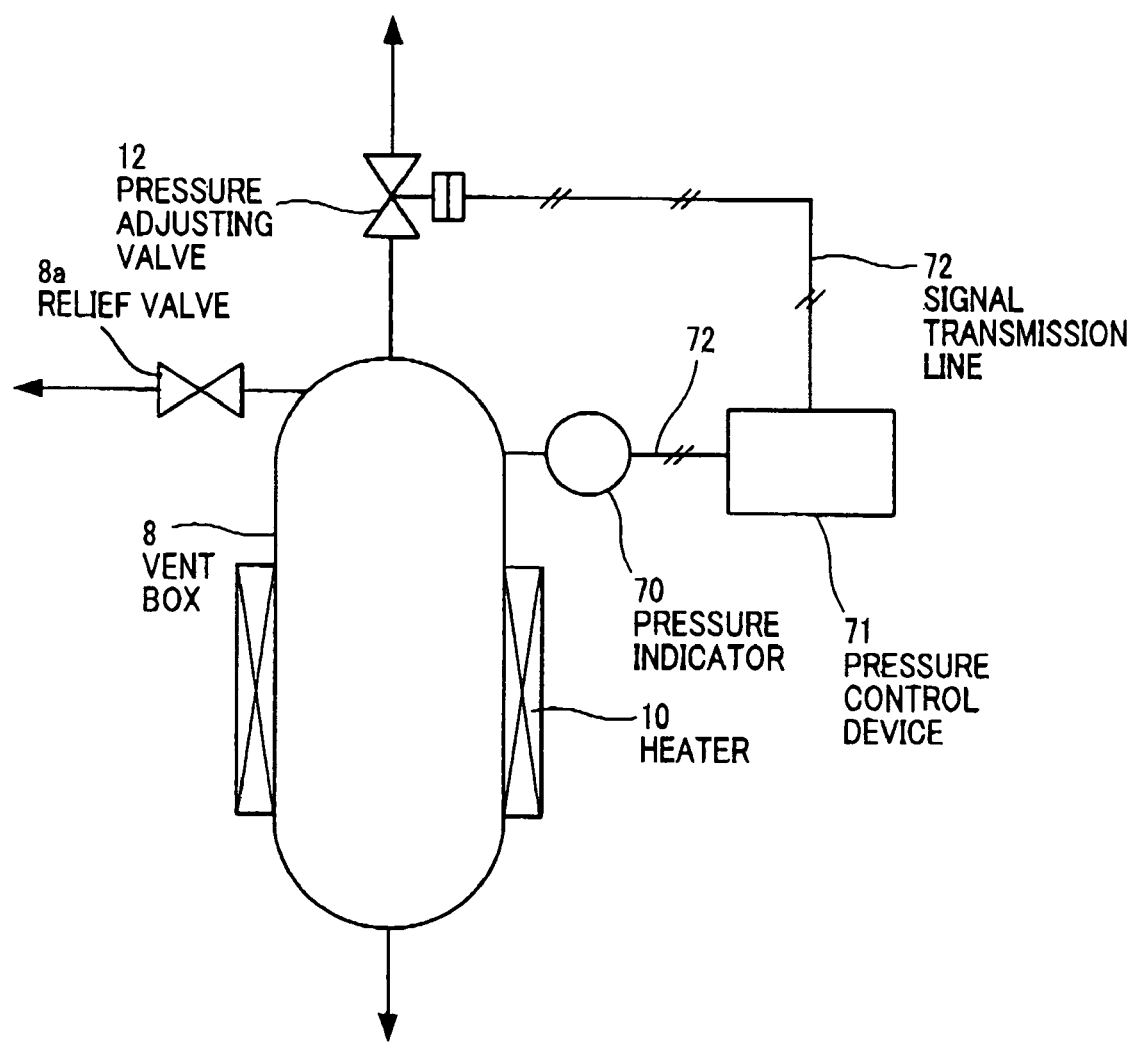
FIG. 3 is a system diagram showing a vent box pressure adjustment mechanism disposed at the subsequent stage of polymer material supplying extruder 1 according to the invention.

FIG. 3 is a system diagram showing a vent box pressure adjustment mechanism disposed at the subsequent stage of polymer material supplying extruder 1 according to the invention.

The mixture of polymer treatment product and reaction agent discharged from the polymer material supplying extruder 1 in FIG. 1 is depressurized to 1 to several tens of atm from the inner pressure of polymer material supplying extruder 1 by the decompression valve 11, and then is supplied to the degassing extruder 2 where the gaseous reaction agent is separated from the viscous liquid polymer treatment product. In the depressurization by the decompression valve 11, the gaseous reaction agent component being compressed at a high pressure expands and simultaneously is blown out inside the vent box 8. In this case, since the volume of vent box 8 is sufficiently greater than that of the blown-out gas, the fluctuation of pressure can be suppressed to some extent. However, the next mechanism allows further stabilization of pressure.

The inner pressure of vent box 8 is measured by a pressure indicator 70 with pressure signal generator, and the pressure signal measured is transferred through a signal transmission line 72 to a pressure control device 71. The pressure control device 71, according to the pressure signal transferred, sends a valve open/close signal through the signal transmission line 72 to the pressure adjusting valve 12. The pressure adjusting valve 12 is an air-actuation type valve and, according to the transmitted signal, adjusts the opening of valve. The opening adjustment of valve 12 is adjusted such that the inner pressure of vent box 8 is kept constant.

Alternatively, the pressure adjustment may be conducted by the cooperation between the decompression valve 11 and the pressure adjusting valve 12. In this case, adding to the pressure indicator 70 with pressure signal generator, means for measuring a pressure difference between forward and back of the decompression valve 11 is provided, and both the former and the latter are controlled to have constant pressures. In controlling the pressure by using both the decompression valve 11 and the pressure adjusting valve 12, if both are controlled only by the signal of vent box 8, the movement of valves interferes with each other and therefore the pressure retention becomes unstable. Therefore, it is desirable that the decompression valve 11 is controlled using a signal of the pressure difference between forward and back thereof and the pressure adjusting valve 12 is controlled using a signal of the pressure of vent box 8 itself.

With these mechanisms, the inner pressure of vent box 8 can be always kept nearly constant, and the continuous and uniform extrusion molding can be conducted by the molding means of degassing extruder 2.

For the safety operation, the vent box may have a relief valve 8a for the unexpected instability of the pressure of the vent box.

For example, in these apparatuses, the continuous stable operation of more than 5 hours can be performed in the range of 2 to 100 kg/h per unit time as the processing amount of cross-linked polyethylene that can be permitted by the discharge capacity of extruder.

FIG. 2 is a flow diagram showing a cross-link cutting treatment apparatus for cross-linked polyethylene in the other preferred embodiment of the invention.

In this embodiment, the vent 9 is attached to the degassing extruder 2 as explained with reference to FIG. 1. Thereby, the remaining reaction agent in the polymer treatment product escapes from the vent 9 through a valve 91 to the combustor 20 side. Therefore, the reaction agent can be more perfectly removed from the polymer treatment product.

By using this apparatus, as with the previous embodiment in FIG. 1, the continuous stable operation of more than 5 hours can be performed in the range of 2 to 100 kg/h per unit time as the processing amount of cross-linked polyethylene that can be permitted by the discharge capacity of extruder.

Figure 4:
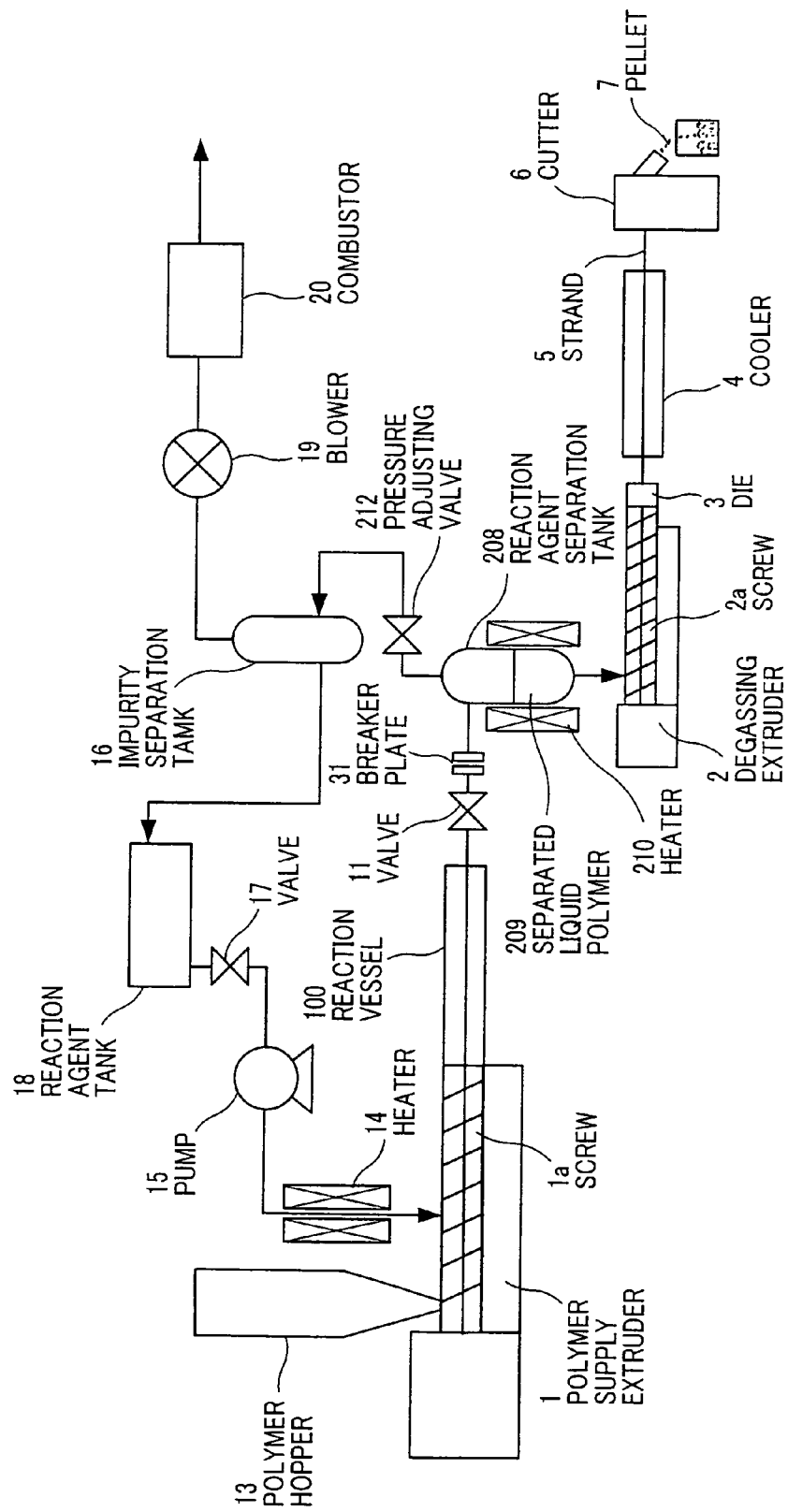
FIG. 4 is a flow diagram showing a cross-link cutting treatment apparatus for cross-linked polyethylene as comparative example 1.

FIG. 4 is a flow diagram showing a cross-link cutting treatment apparatus for cross-linked polyethylene as comparative example 1.

In operation, as with the apparatus shown in FIG. 1, thermosetting resin or cross-linked polymer being pelletized is put through the hopper 13 in the polymer material supplying extruder 1. The polymer material supplying extruder 1 has the same as that shown in FIG. 1. On the other hand, ethanol as a cross-link decomposition reaction agent is supplied from the reaction agent tank 18 through the valve 17, the reaction agent supplying pump 15 and the reaction agent heater 14 to the polymer material supplying extruder 1.

In the polymer material supplying extruder 1, the thermosetting resin or cross-linked polymer, which is retained at high-temperature and pressure, reacts with ethanol in supercritical state and is plasticized. The mixture of plasticized polymer treatment product and reaction agent is, after the sufficient reaction conducted in the distribution type reaction vessel 100, stepwise depressurized by the decompression valve 11, and then by the breaker plate 31, which is a resistor body with multiple holes for decompression of the resin, attached to the decompression valve 11. Then, different from the embodiment in FIG. 1, the mixture is sent to a reaction agent separation tank 208 that is at a pressure slightly higher than atmospheric pressure and lower than that of the distribution type reaction vessel 100.

In the reaction agent separation tank 208, a viscous liquid polymer treatment product 209 is separated from the gaseous reaction agent. The reaction agent separation tank 208 is heated by a heater 210 as an electric heater to be kept at a temperature that the polymer treatment product 209 is in fluid state. The inner pressure of the reaction agent separation tank 208 is kept higher than atmospheric pressure and thereby the polymer treatment product 209 can be easily discharged outside the reaction agent separation tank 208. The polymer treatment product is then sent to the degassing extruder 2 and molded by the die 3 at the discharge end of degassing extruder 2. The degassing extruder 2 may be a single-shaft or double-shaft extruder. In this example, the polymer treatment product is molded into the filamented strand 5 and is then cooled and hardened nearly at room temperature by the cooler 4. The strand 5 is cut into pellets 7 by the strand cutter 6. The degassing extruder 2 may be, as shown in FIG. 2, equipped with the vent 9 so as to perfectly remove the reaction agent from the resin.

On the other hand, the reaction agent, ethanol separated from the polymer treatment product 209 in the reaction agent separation tank 208 is depressurized to atmospheric pressure through a tank pressure adjusting valve 212, and then transferred to the impurity separation tank 16. In the impurity separation tank 16, impurities generated in the reaction process and mixed in the reaction agent, ethanol are separated using a difference of boiling points. Ethanol is returned to the reaction agent tank 18, and the impurities are drawn through a blower 19 into a combustor 20, where they are burned.

In using the apparatus of comparative example 1, when the resin is intermittently discharged, the resin discharged sticks to the wall of the reaction agent separation tank 208 and therefore, the supply of resin to the degassing extruder 2 discontinues. Thus, in comparative example 1, the continuous operation cannot be stably performed for long hours.

Comparative example 2 is provided such that the vent box 8 as vent back in FIG. 1 has a volume of half that of the distribution type reaction vessel 100.

In using the apparatus of comparative example 2, when the resin is intermittently discharged, the inner pressure of vent box 8 becomes higher than half of that of the distribution type reaction vessel 100, due to the discharged resin and alcohol. Thus, the vent box 8 may be broken. Further, when the operation continues, the resin being blown out from the vent box 8 sticks to the vacuuming piping system and the degassing from the piping system discontinues. Therefore, the operation is stopped.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polymer treating method, comprising the steps of:
   reacting a polymer compound with a reaction agent in a reaction vessel to generate a polymer treatment product;
   discharging the polymer treatment product containing the reaction agent from the reaction vessel;
   depressurizing the polymer treatment product;
   introducing the polymer treatment product into a degassing extruder;
   separating the reaction agent from the polymer treatment product through a vent box that is connected to upstream of the degassing extruder and that has a volume of equal to or more than that of the reaction vessel; and
   extruding the polymer treatment product from the degassing extruder.

2. The polymer treating method according to claim 1, wherein:
   the degassing extruder is a double-shaft extruder.

3. The polymer treating method according to claim 1, wherein:
   the degassing extruder comprises a vent disposed on the discharge side thereof so as to remove the reaction agent remaining in the polymer treatment product.

4. The polymer treating method according to claim 1, wherein:
   the reaction vessel is a distribution type reaction vessel that is connected to a polymer material supplying extruder at a previous stage.

5. The polymer treating method according to claim 1, wherein:
   the depressurizing step is conducted by a decompression device, and
   the extruding step comprises a step of extruding the polymer treatment product from the degassing extruder while molding the polymer treatment product.

6. The polymer treating method according to claim 1, wherein:
   the separating step comprises a step of separating an impurity from the separated reaction agent and then storing the separated reaction agent so as to recycle it.

7. The polymer treating method according to claim 1, further comprising the steps of:
   cooling the extruded polymer treatment product; and
   cutting the cooled polymer treatment product.

8. The polymer treating method according to claim 1, wherein:
   the reacting step comprises any one of denaturalization, decomposition and cross-link cutting reactions applied to the polymer compound.

9. The polymer treating method according to claim 1, wherein:
   the polymer compound is a cross-linked polymer, and
   the reaction agent is alcohols or a mixture containing alcohols.

10. The polymer treating method according to claim 1, wherein:
    the polymer compound is previously pelletized prior to application of the polymer treating method.

11. A polymer treating method, comprising the steps of:
    reacting a polymer compound with a reaction agent in a reaction vessel to generate a polymer treatment product;
    discharging the polymer treatment product containing the reaction agent from the reaction vessel;
    depressurizing the polymer treatment product;
    introducing the polymer treatment product into a degassing extruder;
    separating the reaction agent from the polymer treatment product through a vent box that is connected to upstream of the degassing extruder and that has a volume of equal to or more than that of the reaction vessel; and
    extruding the polymer treatment product from the degassing extruder,
    wherein the step of depressurizing the polymer treatment product is performed by a pressure reducing device comprising a resistor body with multiple holes.

12. A polymer treating method, comprising the steps of:
    reacting a polymer compound with a reaction agent in a reaction vessel to generate a polymer treatment product;
    discharging the polymer treatment product containing the reaction agent from the reaction vessel;
    depressurizing the polymer treatment product;
    introducing the polymer treatment product into a degassing extruder;
    separating the reaction agent from the polymer treatment product through a vent box that is connected to upstream of the degassing extruder and that has a volume of equal to or more than that of the reaction vessel; and
    extruding the polymer treatment product from the degassing extruder,
    wherein the polymer compound has a cross-linked structure or a molecular three-dimensional network structure.

13. The polymer treating method according to claim 11, wherein:
    the degassing extruder is a double-shaft extruder.

14. The polymer treating method according to claim 11, wherein:
    the degassing extruder comprises a vent disposed on the discharge side thereof so as to remove the reaction agent remaining in the polymer treatment product.

15. The polymer treating method according to claim 11, wherein:

the reaction vessel is a distribution type reaction vessel that is connected to a polymer material supplying extruder at a previous stage.

16. The polymer treating method according to claim 11, wherein:
the depressurizing step is conducted by a decompression device, and
the extruding step comprises a step of extruding the polymer treatment product from the degassing extruder while molding the polymer treatment product.

17. The polymer treating method according to claim 11, wherein:
the separating step comprises a step of separating an impurity from the separated reaction agent and then storing the separated reaction agent so as to recycle it.

18. The polymer treating method according to claim 11, further comprising the steps of:
cooling the extruded polymer treatment product; and
cutting the cooled polymer treatment product.

19. The polymer treating method according to claim 11, wherein:
the reacting step comprises any one of denaturalization, decomposition and cross-link cutting reactions applied to the polymer compound.

20. The polymer treating method according to claim 11, wherein:
the polymer compound is a cross-linked polymer, and
the reaction agent is alcohols or a mixture containing alcohols.

21. The polymer treating method according to claim 11, wherein:
the polymer compound is previously pelletized prior to application of the polymer treating method.

22. The polymer treating method according to claim 12, wherein:
the degassing extruder is a double-shaft extruder.

23. The polymer treating method according to claim 12, wherein:
the degassing extruder comprises a vent disposed on the discharge side thereof so as to remove the reaction agent remaining in the polymer treatment product.

24. The polymer treating method according to claim 12, wherein:
the reaction vessel is a distribution type reaction vessel that is connected to a polymer material supplying extruder at a previous stage.

25. The polymer treating method according to claim 12, wherein:
the depressurizing step is conducted by a decompression device, and
the extruding step comprises a step of extruding the polymer treatment product from the degassing extruder while molding the polymer treatment product.

26. The polymer treating method according to claim 12, wherein:
the separating step comprises a step of separating an impurity from the separated reaction agent and then storing the separated reaction agent so as to recycle it.

27. The polymer treating method according to claim 12, further comprising the steps of:
cooling the extruded polymer treatment product; and
cutting the cooled polymer treatment product.

28. The polymer treating method according to claim 12, wherein:
the reacting step comprises any one of denaturalization, decomposition and cross-link cutting reactions applied to the polymer compound.

29. The polymer treating method according to claim 12, wherein:
the polymer compound is a cross-linked polymer, and
the reaction agent is alcohols or a mixture containing alcohols.

30. The polymer treating method according to claim 12, wherein:
the polymer compound is previously pelletized prior to application of the polymer treating method.

* * * * *